United States Patent [19]

Montgomery

[11] Patent Number: 5,406,931
[45] Date of Patent: Apr. 18, 1995

[54] PORTABLE COOKING APPARATUS

[76] Inventor: Jerry A. Montgomery, 1115 Fleetwood Place Dr., Houston, Tex. 77070

[21] Appl. No.: 985,797

[22] Filed: Nov. 30, 1992

[51] Int. Cl.⁶ ............................................. F24B 3/00
[52] U.S. Cl. ................................... 126/30; 126/29; 126/9 R; 99/449
[58] Field of Search ............. 126/9 R, 9 B, 25 R, 126/25 C, 29, 30, 50; 99/449, 450

[56] References Cited

U.S. PATENT DOCUMENTS

| | | | |
|---|---|---|---|
| 832,163 | 10/1906 | Ruger, Jr. | 126/30 |
| 1,091,877 | 3/1914 | Collis | 126/30 |
| 2,058,172 | 10/1936 | Myers | 126/29 |
| 2,994,315 | 8/1961 | Bussing | 126/9 R |
| 3,046,969 | 7/1962 | Davis | 126/9 R |
| 3,389,651 | 6/1968 | Schultz | 126/9 R |

*Primary Examiner*—James C. Yeung
*Attorney, Agent, or Firm*—Bill B. Berryhill

[57] ABSTRACT

Portable cooking apparatus which comprises a support stand for supporting the apparatus above a cooking fire; a pair of flat cooking grills between which food to be cooked may be placed and suspension members connecting the pair of cooking grills to the support stand. The suspension members are manipulatable for moving the pair of grills from a horizontal position to a vertical position and then to another horizontal position as the relative position as one grill on top of the other is reversed.

7 Claims, 1 Drawing Sheet

PORTABLE COOKING APPARATUS

BACKGROUND OF THE INVENTION

1. Field of the Invention

The present invention pertains to cooking apparatus. More specifically, the present invention pertains to portable cooking apparatus primarily for outdoor use.

2. Brief Description of the Prior Art

Man has probably been cooking food since he discovered fire ages ago. First outdoor cooking was probably performed over open fires or in pits filled with coals. Outdoor cooking today, of course, is much more sophisticated.

Outdoor cooking, utilizing a number of methods is very popular today. There are many different designs of outdoor cooking apparatus. However, in most of these designs, some sort of cooking grill is provided for support above a fire or charcoal coals. Usually the food, specifically meat, is placed on the grill and cooked on one side for some period of time, then turned over and cooked on the other side. Turning the food above a hot fire is not always easy. For this reason, some designs incorporate a pair of grills between which the food may be placed for cooking on one side and then turned to the other. Some of these designs, such as shown in U.S. Pat. No. 2,058,172, provide a pair of grills which pivot about a fixed axis. In others, such as U.S. Pat. Nos. 2,619,951 and 3,323,443, the food is placed between a pair of grills provided with a handle by which the grills may be turned over.

Another primary object of many outdoor or portable cooking apparatus is the capability of being easily stored, transported and erected for use, While some designs produce excellent results for patio or backyard cooking, they do not lend themselves to compact storage and transportation for picnics and/or traveling to locations away from the home. The fact that many designs continue to be developed indicate the continued desire for outdoor cooking apparatus which utilizes many of these features.

SUMMARY OF THE PRESENT INVENTION

The present invention provides portable cooking apparatus which includes a support stand for supporting the apparatus above a cooking fire, a pair of flat cooking grills between which food to be cooked may be placed and suspension means for supporting the pair of cooking grills over, the cooking fire. The suspension means supports the pair of grills in a horizontal position over the cooking fire, one grill on top of the other. However, it is manipulatable, without disturbing the food during cooking, to move the pair of grills so that the relative positions of one grill on top of the other is reversed.

The support stand of the portable cooking apparatus of the present invention may include a pair of support members, each one of which includes a pair of legs which are connected to allow the legs of each of the support members to move from a side-by-side storage position to a spread apart support position. The pair of grills are also moveable from a horizontal cooking position to a position substantially aligned with the legs when in their side-by-side storage position.

Thus, the portable cooking apparatus of the present invention provides a pair of grills between which food to be cooked may be placed for cooking on one side and then cooking on the other. The grills are suspended from a support stand and the grills and legs of the support stand are moveable from cooking positions to a side-by-side compact storage position. Thus, not only does the cooking apparatus provide efficient cooking, it does so with apparatus which is very compact, easily stored, transported and erected for cooking. Many other objects and advantages of the invention will be apparent from reading the description which follows in conjunction with the accompanying drawings.

DESCRIPTION OF A PREFERRED EMBODIMENT OF THE INVENTION

Figure 1:
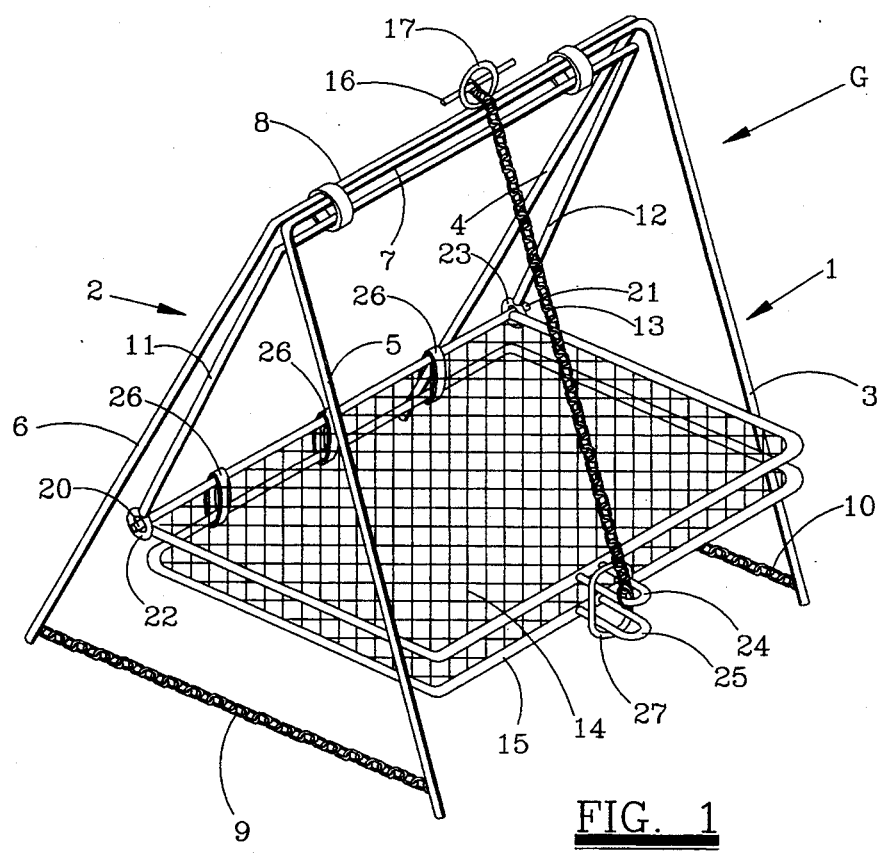
FIG. 1 is a pictorial illustration of outdoor cooking apparatus, according to a preferred embodiment of the invention.

Referring first to FIG. 1, the portable cooking apparatus 1 of the present invention includes a support stand which comprises two inverted U-shaped supports 1 and 2, each one of which has a pair of legs 3,5 and 4,6 joined by horizontal cross-members 7 and 8, respectively. The cross-members 7 and 8 are hingedly connected so that the U-shaped supports 1,2 may be folded up in a side-by-side storage position or set up in a spread apart A-frame support position such as shown in FIG. 1. To limit how far apart the legs may be spread, limit devices such as chains 9,10 connected to lower portions of corresponding legs 5,6 and 3,4, respectively, may be provided.

Suspended from the A-frame support members 1 and 2 are a pair of flat grills 14 and 15. As shown in FIG. 1, the grill 14 lies on top of grill 15. However, as hereinafter described, these positions may be reversed. The corners of one side of at least one of the grills, 14 in the exemplary embodiment, are provided with a pivot post 20,21 to which are attached rings 22,23 at one end of rigid rods 11 and 12. The rods 11 and 12 are hingedly or pivotally connected at the opposite ends to the cross members 7,8 of the support stands 1 and 2. Connected to an extension 24 at the mid-point of the other side of the grill member 14 is a chain 13 which extends through a ring 17 attached to one of the A-frame supports 1 and 2 for connection to a handle 16. Thus, the grills 14 and 15 are suspended from the A-frame support by three point connection of rods 11,12 and chain 13.

The pair of grills 14 and 15 are hingedly connected by rings 26 or the like along mutually corresponding first sides thereof and provided with a latch device 27 at the other side thereof. Engagement of the latch device 27 with extensions 24 and 25 hold the pair of grills together. However, the latch device 27 is releasable to allow the grills to open about their hinged connection to permit removal or replacement of food therebetween.

Figure 2:
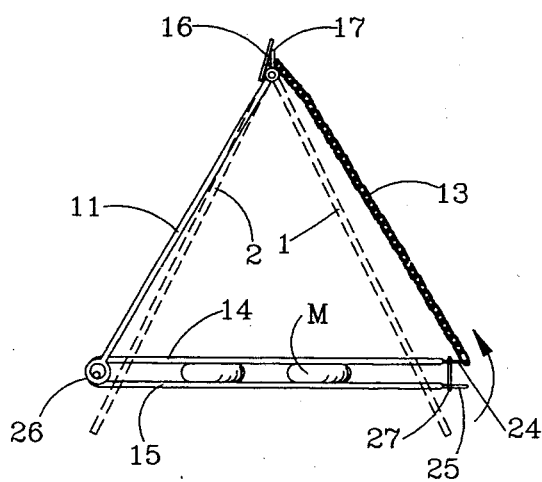
FIG. 2 is an end elevation view of the cooking apparatus of the present invention, illustrating the cooking of meat thereon.
Figure 3:
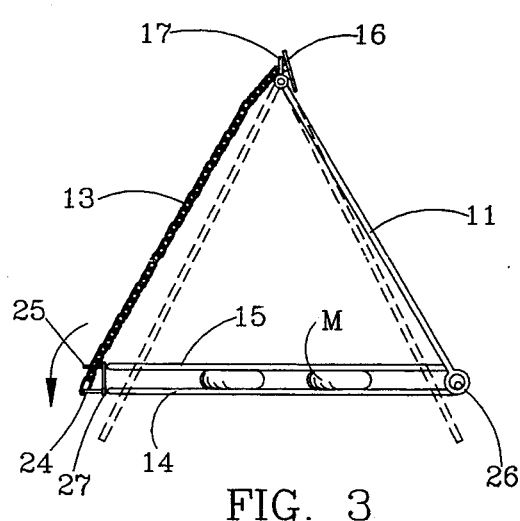
FIG. 3 is an end elevation view of the portable cooking apparatus of the present invention, similar to FIG. 2 but showing the grills reversed from the position of FIG. 2.

In FIGS. 2 and 3 the cooking apparatus of the present invention is illustrated as being in the set up cooking position with the support members 1 and 2 shown as dotted lines. Meat M (steak, chicken, etc.) is placed between the grill members 14 and 15 with a fire (not shown) beneath the grills and meat M. The pair of grills 14 and 15 are in the position shown in FIGS. 1 and 2. After the meat M has cooked sufficiently on one side, the handle 16 may be grasped and the chain 13 pulled upwardly through the ring 17 causing the pair of grill members 14, 15 to pivot about their connections with the lower end of rods 11 and 12 (as illustrated by the arrow), pivoting between the rods 11 and 12, first to a substantially vertical position and flipping to a reverse position illustrated in FIG. 3, i.e. with the grill 15 on top of grill 14. As this occurs, the handle 16 and chain 13 are gradually released so that the grill may then be suspended in a horizontal position of FIG. 3, the rods 11 and 12 pivoting to the opposite side and grill 15 now becoming the top grill and grill 1.4 becoming the bottom grill. As this occurs, of course, the meat M is flipped to the opposite side so that its uncooked side may then be cooked.

After cooking is completed, a force may be applied to the chain 13 by grasping the handle 16 and pivoting the pair of grill members 14,15 to a substantially vertical position. A further lifting force may be applied allowing the legs of the support stands 1 and 2 to move together so that the grill members and the legs assume a side-by-side transport or storage position.

Thus, the cooking apparatus of the present invention provides unique apparatus for efficient cooking of food on both sides without having to physically turn the meat over piece by piece. After it is cooked on one side, the grills are simply reversed to allow the food to be cooked on the opposite side. In addition, the apparatus is extremely simple to manufacture and use and may be easily stored and transported.

A single embodiment of the invention has been described herein. However, many variations thereof can be made without departing from the spirit of the invention. Accordingly, it is intended that the scope of the invention be limited only by the claims which follow.

I claim:

1. Portable cooking apparatus comprising:
   a support stand for supporting said apparatus above a cooking fire;
   a pair of flat cooking grills between which food to be cooked may be placed for cooking by said cooking fire; and
   suspension means connecting said pair of cooking grills to said support stand and supporting said pair of grills in a horizontal position over said cooking fire, one grill on top of the other, said suspension means comprising one or more rigid elongated members, pivotally connected at one end to one side of said pair of grills and pivotally connected at the other end to said support stand, and a flexible member connected at one end to the opposite side of said pair of grills and at the other end to said support stand, said flexible member capable of having a force applied thereto to lift said opposite side of said pair of grills so that said pair of grills moves from a horizontal position toward a vertical position and then to a horizontal position as the relative position of one grill on top of the other is reserved.

2. Portable cooking apparatus as set forth in claim 1 in which said pair of grills are hingedly connected along mutually corresponding first sides thereof and provided with latch means at mutually corresponding second sides thereof, said latch means capable of holding said pair of grills together and being releasable to allow said grills to open about said hinged connection thereof to permit removal or placement of food therebetween.

3. Portable cooking apparatus as et forth in claim 1 in which said support stand comprises a pair of inverted U-shaped support members each one of which includes a horizontal cross member downwardly from which extends a pair of legs.

4. Portable cooking apparatus as set forth in claim 3 in which the corresponding cross members of each of said pair of support members are hingedly connected to allow the legs of each of said support members to move from a side-by-side storage position to a spread apart support A-frame position.

5. Portable cooking apparatus as set forth in claim 4 including limit means connecting corresponding opposing legs of each of said pair of said support members to limit how far said legs may be spread apart.

6. Portable cooking apparatus as set forth in claim 4 in which said suspension means comprises one or more rigid elongated members pivotally connecting one side of said pair of grills to the cross member of said support members and a flexible member connecting the other side of said pair of grills to the cross members of said support members, said flexible member capable of having a lifting force applied thereto to lift said other side of said pair of grills to a substantially aligned position with said legs when in said side by side storage position.

7. Portable cooking apparatus comprising:
   a support stand for supporting said apparatus above a cooking fire, said support stand comprising a pair of inverted U-shaped support members each one of which includes a horizontal cross member downwardly from which extends a pair of legs, the cross members of each of said pair of support members being hingedly and mutually connected to allow the legs of each of said support members to move from a side-by-side storage position to a spread apart A-frame support position;
   a pair of flat cooking grills between which food to be cooked may be placed for cooking by said cooking fire; and
   suspension means connecting said pair of cooking grills to said support stand and supporting said pair of grills in a horizontal position over said cooking fire, one grill on top of the other, said suspension means comprising one or more rigid elongated members pivotally connecting one side of said pair of grills to the cross members of said support members and a flexible member connecting the other side of said pair of grills to the cross members of said support members, said flexible member capable of having a lifting force applied thereto to lift said other side of said pair of grills to a substantially aligned position with said legs when in said side by side storage position.

* * * * *